United States Patent
Kobres

(10) Patent No.: US 10,887,296 B2
(45) Date of Patent: Jan. 5, 2021

(54) SECURE PROVISIONING MANIFEST FOR CONTROLLING PERIPHERALS ATTACHED TO A COMPUTER

(71) Applicant: NCR Corporation, Duluth, GA (US)

(72) Inventor: Erick Christian Kobres, Lawrenceville, GA (US)

(73) Assignee: NCR Corporation, Atlanta, GA (US)

( * ) Notice: Subject to any disclaimer, the term of this patent is extended or adjusted under 35 U.S.C. 154(b) by 820 days.

(21) Appl. No.: 13/732,088

(22) Filed: Dec. 31, 2012

(65) Prior Publication Data

US 2014/0188732 A1 Jul. 3, 2014

(51) Int. Cl.
*G06Q 20/38* (2012.01)
*H04L 29/06* (2006.01)

(52) U.S. Cl.
CPC ........... *H04L 63/08* (2013.01); *G06Q 20/382* (2013.01); *H04L 63/0442* (2013.01); *H04L 63/102* (2013.01)

(58) Field of Classification Search
CPC ...... G06F 9/455; G06F 20/12; G06F 10/0833; G06F 21/6209; G06F 3/041; G06F 9/4418; G06Q 30/0277; G06Q 20/4016; G06Q 20/42; G06Q 20/322; G06Q 30/0601; G06Q 20/425; G06Q 20/354; G06Q 20/202; G06Q 20/4012; G06Q 20/382; G06Q 40/08; G06Q 20/3278
See application file for complete search history.

(56) References Cited

U.S. PATENT DOCUMENTS

| | | | | |
|---|---|---|---|---|
| 5,663,547 A | * | 9/1997 | Ziarno | A47G 33/00 235/375 |
| 5,742,845 A | * | 4/1998 | Wagner | G06F 8/33 705/26.1 |
| 6,408,406 B1 | * | 6/2002 | Parris | G11B 20/182 714/41 |
| 7,004,385 B1 | * | 2/2006 | Douglass | G06Q 20/1085 235/375 |
| 7,266,842 B2 | * | 9/2007 | Foster | G06F 21/64 713/190 |
| 7,409,563 B2 | * | 8/2008 | Howard | G06F 21/445 439/147 |
| 8,355,982 B2 | * | 1/2013 | Hazel | G06Q 20/04 705/35 |
| 2003/0041092 A1 | * | 2/2003 | Woo | G06Q 10/107 709/200 |
| 2003/0126236 A1 | * | 7/2003 | Marl | H04L 29/08846 709/220 |
| 2005/0235091 A1 | * | 10/2005 | Chen | G06F 13/4022 710/313 |
| 2007/0209072 A1 | * | 9/2007 | Chen | G06F 21/10 726/16 |

(Continued)

*Primary Examiner* — Johann Y Choo
(74) *Attorney, Agent, or Firm* — Schwegman. Lundberg & Woessner

(57) ABSTRACT

There is provided a secure provisioning manifest used to authenticate and communicate with peripherals attached to a computer. A secure I/O module, that is separate from an operating system and transaction software executed by a processor of the computer, uses the secure provisioning manifest to establish a secure encrypted session for communicating with each peripheral attached to the computer when a peripheral is authenticated and able to establish a secure encrypted session.

27 Claims, 6 Drawing Sheets

(56) References Cited

U.S. PATENT DOCUMENTS

| | | | |
|---|---|---|---|
| 2007/0271383 A1* | 11/2007 | Kim | H04L 63/08 709/227 |
| 2008/0013726 A1* | 1/2008 | Kuriya | H04N 7/1675 380/210 |
| 2010/0235833 A1* | 9/2010 | Huang | G06F 21/575 718/1 |
| 2011/0055546 A1* | 3/2011 | Klassen | G06F 21/305 713/150 |
| 2011/0087869 A1* | 4/2011 | Teranoshita | H04L 41/0806 713/1 |
| 2011/0215146 A1* | 9/2011 | Shams | G06F 17/00 235/383 |
| 2011/0246756 A1* | 10/2011 | Smith | H04L 9/3252 713/2 |
| 2012/0099720 A1* | 4/2012 | Soundar | H04M 3/5158 379/265.02 |
| 2012/0192203 A1* | 7/2012 | Corry | G06F 9/544 719/312 |
| 2013/0124630 A1* | 5/2013 | Reunamaki | H04L 29/1232 709/204 |

\* cited by examiner

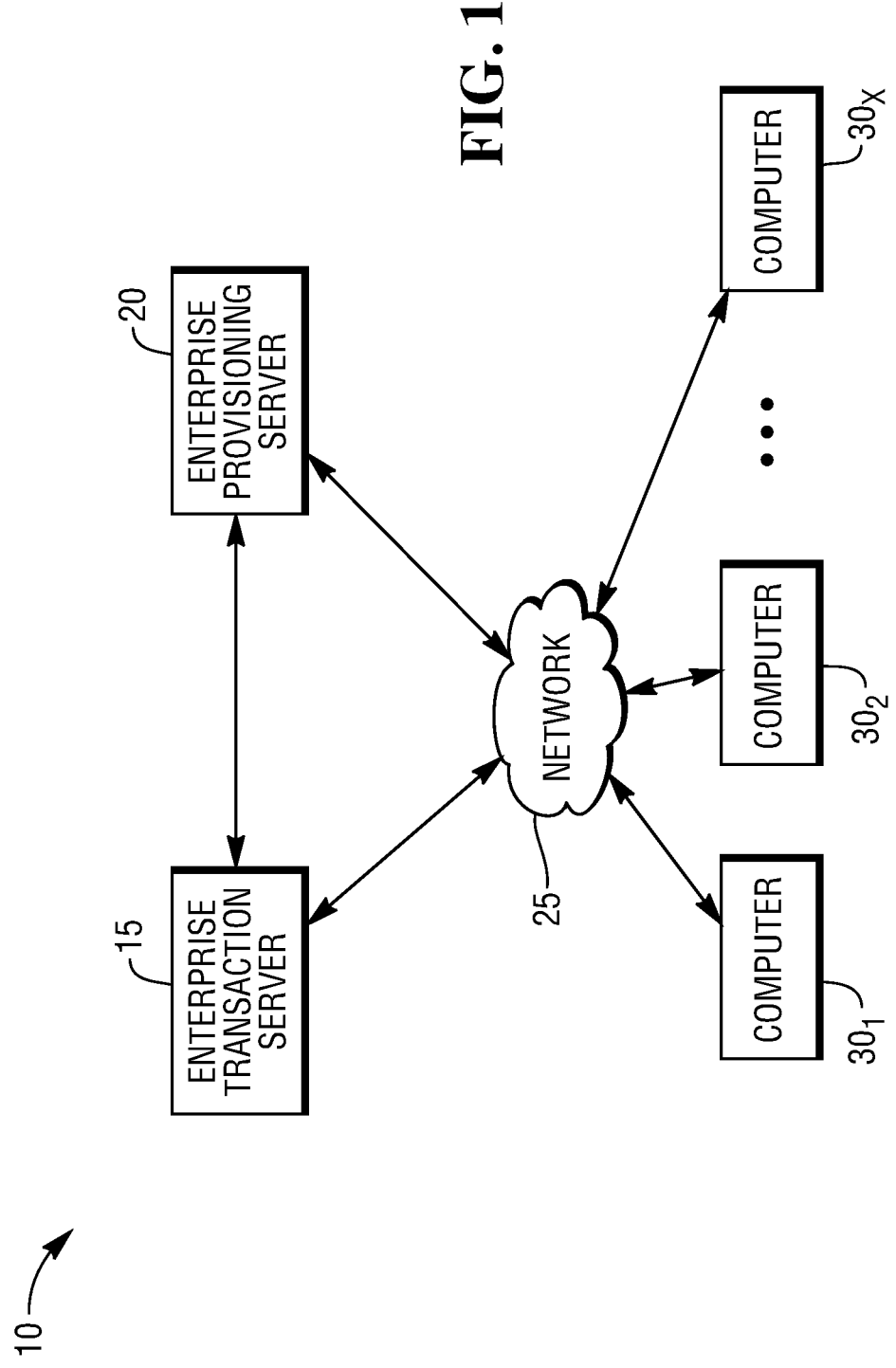

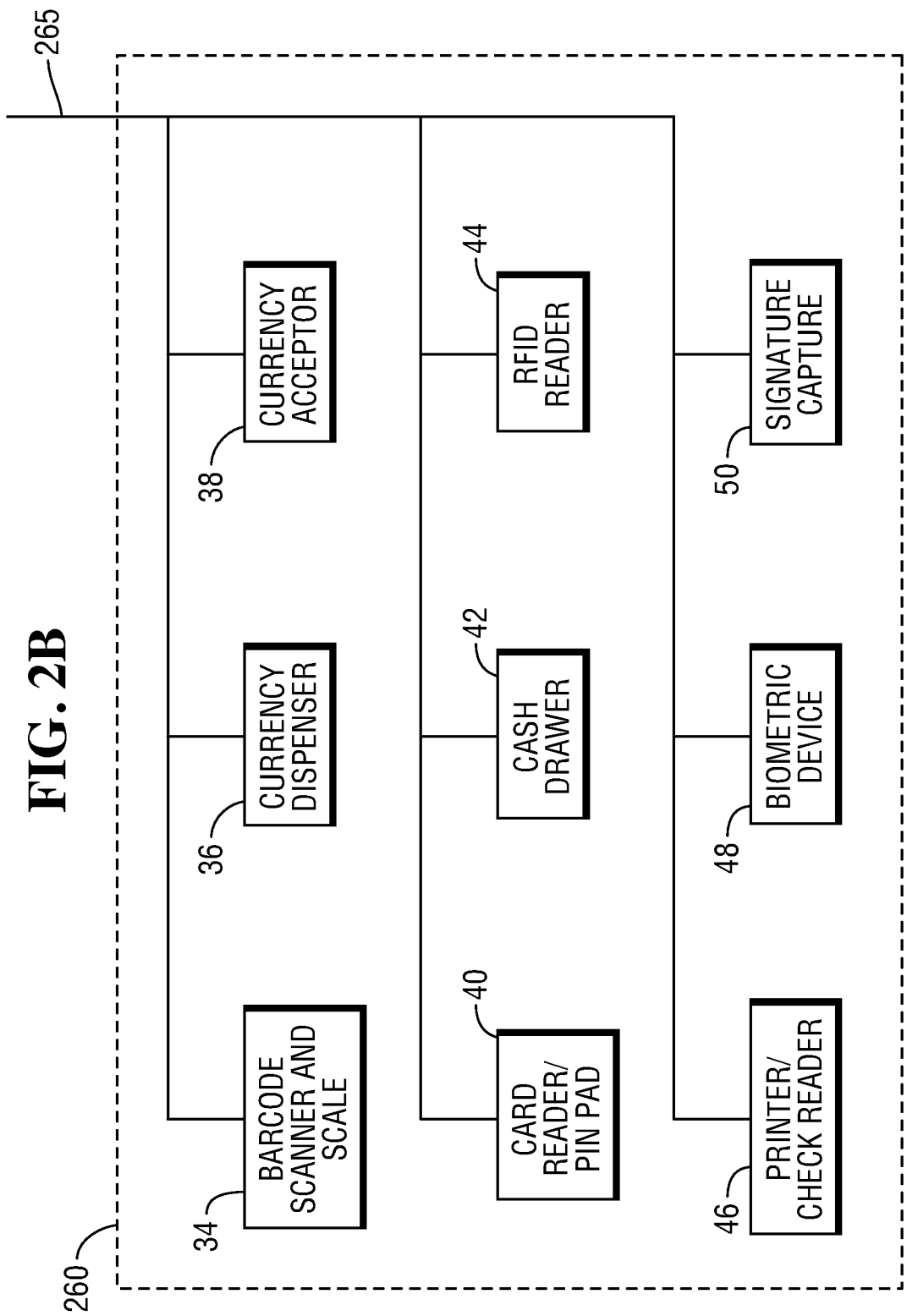

FIG. 4

SECURE PROVISIONING MANIFEST — 250

1. SECURE TRANSACTION SERVICE ID
2. SECURE I/O MODULE ID
3. ISSUE DATE
4. EXPIRE DATE
5. GRACE PERIOD
6. POLICY RECORD SET 1 (PIN)
7. POLICY RECORD SET 1 (PIN)
8. POLICY RECORD SET 2 (STS)
9. POLICY RECORD SET 3 (SCAN)
10. POLICY RECORD SET 4 (MSR)
11. POLICY RECORD SET 5 (NFC)
12. POLICY RECORD SET 6 (NETWORK)

⎫ 405

| ID | PUBLIC KEY | VENDOR ID | PID | SERIAL NO. | POLICY SET |
|------|----------------|-----------|------|------------|------------|
| A456 | ************** | NCR | 5999 | ----- | PIN |
| S123 | ************** | NCR | 9800 | ----- | STS |
| A345 | ************** | NCR | 7899 | ----- | SCAN |
| A234 | ************** | NCR | 5949 | ----- | MSR |
| A567 | ************** | NCR | 1299 | ----- | NFC |

410 — 415

SECURE PROVISIONING MANIFEST FOR CONTROLLING PERIPHERALS ATTACHED TO A COMPUTER

CROSS-REFERENCE TO RELATED APPLICATIONS

This application claims the benefit of U.S. Provisional Application No. 61/695,978, filed Aug. 31, 2012 which is hereby incorporated by reference. This application is also related to U.S. patent application Ser. No. 13/612,305, filed Sep. 12, 2012, titled "Security Module and Method of Securing Payment Information" having the same assignee as this application is hereby incorporated by reference.

FIELD OF THE INVENTION

The present invention relates to computers used to receive and process sensitive and/or financial information and more specifically to a secure provisioning manifest used by a computer to authorize secure communications with peripherals attached to the computer.

BACKGROUND

Protection of valuable and/or sensitive information including payment card data, personal identification numbers (PINs) and personal identification information from theft is a problem for many companies in many industries. To deal with this problem, the Payment Card Industry (PCI) provides security guidelines for payment peripherals, such as card readers, keyboards containing card readers, and PIN entry devices. The guidelines require that such peripherals meet certain requirements for data encryption and encryption key management.

In addition to payment peripherals, there are other types of peripherals that are used to input valuable or sensitive information. For example, an optical code scanner can be used to read a barcode on a personal identification document that has sensitive personal information encoded in the barcode. In another example, a radio frequency identification (RFID) reader can be used to an RFID chip located in a personal identification document that also has sensitive personal information that is read from the chip.

These and other peripherals are used to read valuable and/or sensitive information but these peripherals are not subject to standards that would protect the data from attack by a third party. Additionally, there is nothing to stop a third party from replacing a factory standard peripheral with a peripheral with the same interface but that has been altered to capture information what would be improperly used.

Therefore, it would be desirable to provide a device for and method of authenticating any peripheral attached to a computer and to provide secure communications with any authenticated peripheral attached to a computer.

SUMMARY

Among its several aspects, the present invention seeks to overcome or ameliorate at least one of the disadvantages of the prior art, or to provide a useful alternative.

In accordance with the teachings of the present invention, a secure provisioning manifest and a secure I/O module are provided for authenticating and securely communicating with authenticated peripherals attached to a computer.

Among its several aspects, the present invention recognizes there is an advantage to being able to identify and authenticate peripherals attached to a computer and to establish a secure encrypted session to communicate with authenticated peripherals. The advantage includes determining when unauthorized or unsecure peripherals are attached to the computer and further determining if an unauthorized or unsecure peripheral represents a security threat to the computer. When a peripheral represents a security threat, actions are taken to restrict communications with the peripheral or to terminate all normal functions of the computer.

Among its several aspects, the present invention recognizes there is an advantage to having a secure execution environment that is separate from the standard execution environment of a personal computer. The standard execution environment of a personal computer includes a processor, memory, network communications, a graphics controller and the processor executes any of the operating systems normally associated with a personal computer to control the normal features and functions of the personal computer. The secure execution environment is separate from the standard execution environment and includes a processing element, memory and software executed by the processing element to control the secure execution environment. The standard execution environment does not have physical access to the resources of the secure execution environment which prevents malicious software executing within the standard execution environment from accessing valuable and/or sensitive information stored in the secure execution environment. The secure I/O module and the secure provisioning manifest operate within the secure execution environment. The secure execution environment and standard execution environment are able to communicate with each other.

In accordance with an embodiment of the present invention, there is provided a transaction system and a computer that use a secure provisioning manifest to authorize, authenticate and control peripherals attached to the computer. To this end, a computer is presented that may suitably comprise: a peripheral attached to the computer; a secure I/O module in communication with the peripheral wherein the secure I/O module is adapted to use a secure provisioning manifest to establish a secure encrypted session with the peripheral when it is determined that information received from the peripheral matches information stored in the secure provisioning manifest and to generate a logical peripheral interface that uses the secure encrypted session to communicate with the peripheral; and a main processor configured to execute an operating system where the operating system uses the logical peripheral interface to control and communicate with the peripheral and where only the secure I/O module is configured to decrypt information received from the peripheral using the secure encrypted session.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

FIG. 1 is a high-level block diagram illustrating an exemplary embodiment of a transaction system that implements a secure provisioning manifest.

FIG. 2B is a high-level block diagram illustrating selected peripherals attached to the transaction computer of FIG. 2A.

FIG. 4 is a high-level diagram illustrating a secure provisioning manifest.

DETAILED DESCRIPTION

Figure 2A:
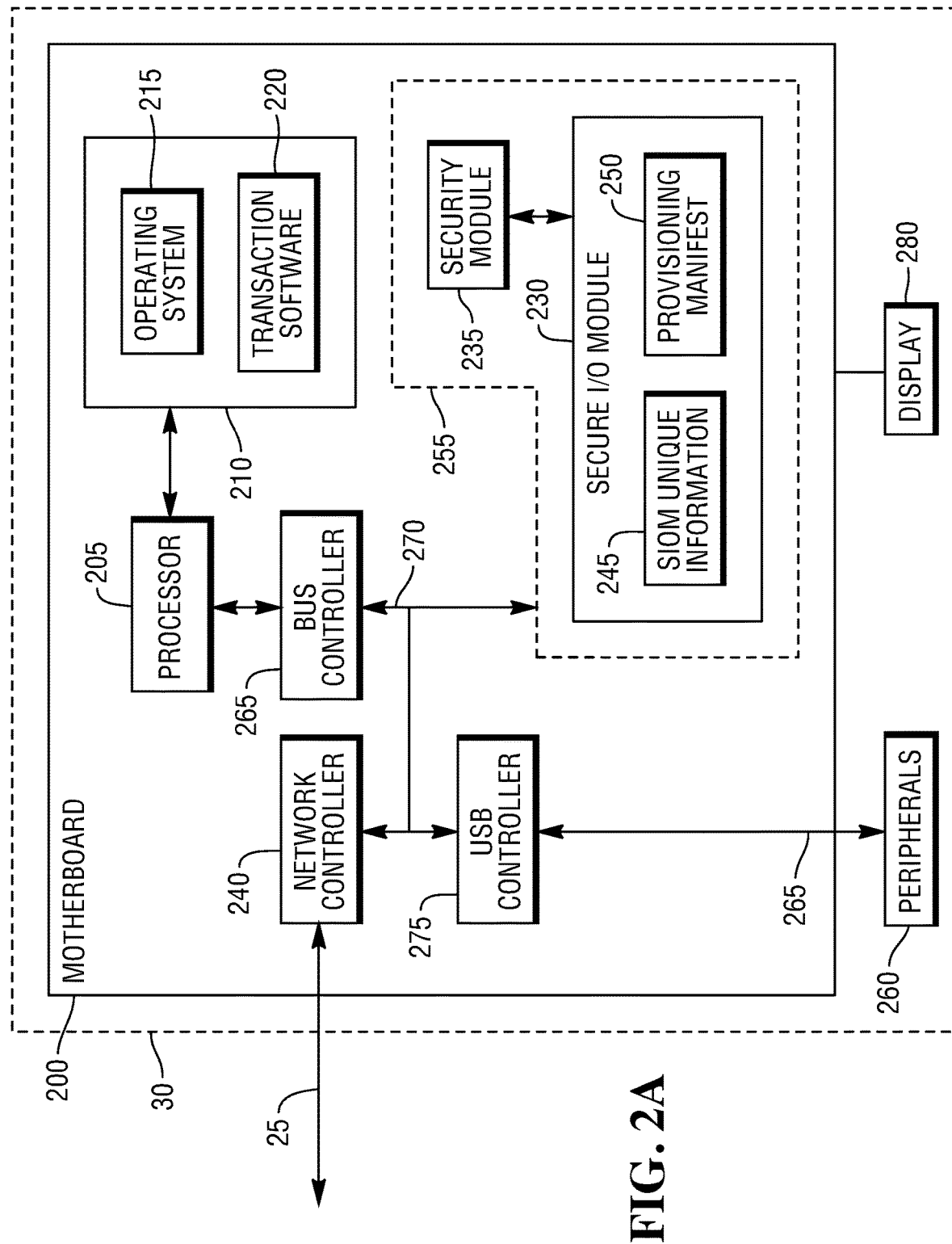
FIG. 2A is a high-level block diagram illustrating selected hardware and software components of a transaction computer.

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

With reference to FIG. 1, there is provided a transaction system 10 including an enterprise transaction server 15 and an enterprise provisioning server 20 where each server is connected to a plurality of transaction computers $30_{1-X}$ over a network 25. The enterprise transaction server 15 is a secure server and executes a secure transaction service that facilitates transactions between the transaction computers $30_{1-X}$ and external services. The external services may suitably include services provided by financial acquirers that accept credit card transactions and financial institutions that process debit transactions.

A secure server is a server computer physically located within a secure data center. A secure data center limits and controls physical and remote access to computers within the center. The computers within the secure data center are provided with network connections to one or more outside public or private networks so they can provide a service to customers. A secure computer will typically execute software that performs financial transactions or processes valuable and/or sensitive information.

The enterprise provisioning server 20 is a secure server and executes enterprise provisioning software. The enterprise provisioning software maintains data on all the transaction computers $30_{1-X}$. The data includes unique information that identifies each of the transaction computers $30_{1-X}$ and includes a secure provisioning manifest (FIG. 2, element 250) that includes information identifying peripherals that are authorized to be attached to each of the transaction computers $30_{1-X}$. The enterprise provisioning server 20 also receives status information from each of the transaction computers $30_{1-X}$. The status information may suitably include alert information when an unauthorized peripheral is determined to be attached to one of the transaction computers $30_{1-X}$.

The transaction computers $30_{1-X}$ are coupled to the remote enterprise transaction server 15 and enterprise provisioning server 20 via the network 25. The network 25 may include a network which uses a communications protocol based on transmission control protocol/internet protocol (TCP/IP). The network 25 may include a combination of local area and wide area networks. The network 25 may include any combination of wireless or wired networks. The network 25 may include a combination of private and public networks, including a global communication network, also known as the Internet. Cloud based servers are remote computers accessed over a public network, also known as the Internet.

The transaction computers $30_{1-X}$ may suitably be located within a single location, for example in a single retail store, or they may be divided among many locations across a large geographic area, for example in multiple retail stores located around the world. The transaction computers $30_{1-X}$ includes multiple different types of computers. An example embodiment of one type of the transaction computers $30_{1-X}$ includes a computer configured as a self-service point-of-sale (POS) transaction terminal used to process customer purchase transactions where a customer operates the terminal. In another example embodiment one type of the transaction computers $30_{1-X}$ includes a computer configured as an assisted point-of-sale (POS) transaction terminal used to process customer purchase transactions where an employee operates the terminal. Other example transaction computers and environments are also envisioned.

Turning now to FIG. 2A, there is provided an example embodiment of a transaction computer 30 that may suitably be used as one of the transaction computers $30_{1-X}$. The transaction computer 30 includes a motherboard 200, a display 280 and a plurality of peripherals 260 that may suitably be attached to and controlled by the transaction computer 30. The motherboard 200 includes a processor 205, a memory 210, a bus controller 265, a network controller 240, a universal serial bus (USB) controller 275 and a secure processing module 255. The processor 205 communicates with the memory 210 which includes computer instructions that implement an operating system 215 and computer instructions that implement transaction software 220. The processor 205 executes the computer instructions in the memory 210. While the processor 205 is depicted and referred to as a single processor, multiple processors and processors with multiple processor cores are envisioned and within the scope and definition of this invention. The processor 205 creates a standard processing environment wherein software stored in the memory 210 are executed.

The memory 210 uses non-transitory storage devices including both volatile and non-volatile memory. The non-volatile memory may include flash memory, other types of solid state electronic memory and rotating storage devices, such as disk drives or the like. Computer instructions stored in the memory 210 are executed by the processor 205 and causes the processor 205 to control the devices and peripherals attached to the transaction computer 30 and to provide the services and functions performed by the operating system 215 and the transaction software 220. The operating system 215 may suitably include a Microsoft, Linux, Apple, or other operating system. The transaction software 220 displays transaction screens on the display 280 for guiding an operator through a transaction and receives operator inputs and selections during the transaction. The transaction software 220 may also process a payment for the transaction. In some embodiments, the transaction software 220 relies on other software to process the transaction and provide an acknowledgement once payment has been made.

The transaction computer 30 further includes graphics circuitry for providing display screens to the display 280. The display 280 may suitably include a flat panel LCD display and it may also include a touch screen device that senses where the screen is touched. The bus controller 265 provides a high speed computer bus 270 that allows the processor 205 to communicate with the components on the motherboard 200. The network controller 240 provides the hardware and software needed to connect to and support communications with the network 25. The operating system 215 includes driver software that interfaces with the network controller 240 that provides a network stack that supports the network 25. The peripherals 260 are connected to the transaction computer 30 over a Universal Serial Bus 265 controlled by the USB controller 275. In some embodiments, one or more of the peripherals 260 may communicate over other connections such as serial RS-232, serial RS-485, Firewire, or other circuitry for connecting peripherals. The operating system 215 may establish basic communications with some or all of peripherals 260 connected to the transaction computer 30 at a driver level. An application program interface (API) is provided that uses the driver level connection to the peripherals 260. The secure processing module 255 has access to the API to communicate with the peripherals 260.

The secure processing module 255 provides a secure processing environment separate from the standard processing environment provided by the processor 205 executing the computer instructions stored in the memory 210. The secure processing module 255 and the processor 205 can communicate with each other over computer bus 270. However, the processor 205 does not have access to or control over elements within the secure processing environment provided by the secure processing module 255. More details of the secure processing module 255 are provided below.

In other example embodiments, the security processing module 255 may be external to the transaction computer 30. For example, the security processing module 255 may be incorporated into its own separately housed component for retrofitting existing computers without built-in capability or into a peripheral, either of which may be connected to the transaction computer 30 through peripheral connection circuitry. In another example, the secure processing module 255 may be implemented in a separate secure computer that controls a number of peripherals at different locations, for example, a single secure computer would control the card reader at each gas pump at a gas station and a different transaction computer would process the purchase transaction while communicating with the secure computer.

The secure processing module 255 may be implemented using hardware logic, software instructions, or a combination of both. The secure processing module 255 has a secure processing environment that is separate from the standard processing environment of the motherboard 200 that is created by the processor 205. In some embodiments, both the secure processing environment and the standard processing environment are created by one processor that is running virtual machine software that separates the two environments.

The secure processing module 255 protects customer information received from one or more of the peripherals 260 by establishing an encrypted secure session with each peripheral 260. For example, the secure I/O module 230 may communicate with the card reader peripheral 40 via standard protocols and/or proprietary protocols via the USB controller 275. Once the card reader peripheral 40 is authenticated, the secure I/O module 230 establishes an encrypted secure session with the card reader peripheral 40. The card reader peripheral 40 then encrypts all data it sends to the secure I/O module 230. The secure I/O module 230 decrypts and provides the data received from the card reader peripheral 40 to the operating system 215 which provides it to the transaction software 220. The secure I/O module 230 also encrypts any data it sends to the card reader peripheral 40. No cryptographic key data is transferred between the secure I/O module 230 and the peripheral during the process of establishing the secure session. Cryptographic keys need not be communicated because the secure provisioning manifest 250 includes all cryptographic key data needed by the secure I/O module 230 to encrypt and decrypt data communicated between the peripheral and the secure I/O module 230.

The secure I/O module 230 preferably controls the flow of encrypted data from the peripherals 260 independently of the operating system 215, with the operating system 215 only establishing a connection with the peripherals 260 at a driver level. It should also be noted that once the secure session is established with one of the peripherals 260, the data received and transmitted by the driver level connection is encrypted and the operating system 215 cannot decrypt or encrypt the data. Only the secure I/O module 230 can decrypt or encrypt the data.

The secure I/O module 230 is invisible to operating system 215. That is, the operating system 215 has no driver or control over the secure I/O module 230 or the encrypted secure sessions between the secure I/O module 230 and the peripherals 260. In the case where the Intel Core vPro™ brand processor is used for the processor 205, the operating system 215 has no driver or other control of the portion of the processor 205 that performs the functions of the secure I/O module 230. This minimizes the chance of a fraudster gaining access to the encryption keys stored in the secure processing module 255 through the operating system 215.

The operating system 215 uses the network controller 240 on the motherboard 200 to communicate over the network 25. In some embodiments, software executing in the secure processing module 255 uses a software interface to the operating system 215 to send and receive information over the network 25. In other embodiments, the secure processing module 255 includes separate network hardware and software, not available to the operating system 215, to communicate with remote computers (e.g., the enterprise transaction server 15 and the enterprise provisioning server 20) either over the network 25 or over a different network. In still other embodiments, the secure processing module 255 uses both the interface to the operating system 215 and the separate network hardware and software to communicate with the remote computers.

The secure I/O module 230 controls encrypted secure sessions with the peripherals attached to the transaction computer 30 that are able to support encrypted sessions. The peripherals include the display 280 and one or more of peripherals 260. The secure I/O module 230 polls all peripherals upon power up to obtain information that uniquely identifies the peripheral. The information includes the vendor's model, product identification and serial number of the peripheral. The secure I/O module 230 using the secure provisioning manifest 250 determines if it is authorized to communicate with each peripheral. The secure provisioning manifest 250 includes peripheral information for each peripheral the secure I/O module 16 is authorized to communicate with. If the unique information from the peripheral matches corresponding information in the secure provisioning manifest 250 then, the secure I/O module 230 queries the peripheral to determine if it can communicate via an encrypted data link. If the peripheral can communicate via an encrypted data link, then the secure I/O module 230 issues a test message to the peripheral, upon which the secure I/O module 230 expects a certain encrypted response. If the response matches what is expected, then the secure I/O module 230 establishes an encrypted secure session with the peripheral, occasionally "testing" the unique information of the peripheral to ensure a substitute peripheral has not somehow been substituted.

The security processing module 255 further includes a security module 235. The security module 235 includes software that implements additional features and functions used to process transactions. These functions include communicating with the enterprise transaction server 15 to process a transaction using information acquired from one or more of the peripherals 260 over an encrypted secure session. The security module 235 also stores encryption keys, which may include communication or session keys, financial provider keys, and retail provider keys.

Turning now to FIG. 2B, there is provided a high-level block diagram illustrating selected peripherals 260 that may be attached to the transaction computer 30. The peripherals 260 communicate with the transaction computer 30 using a USB connection or other suitable forms of computer communications. The peripherals 260 depicted in FIG. 2B are not meant to be an exhaustive list nor is it meant to imply that all of the peripherals 260 depicted must be present in every embodiment of the transaction computer 30 used in the transaction system 10. The peripherals 260 include a barcode scanner and scale 34, a currency dispenser 36, a currency acceptor 38, a card reader/pin pad 40, a cash drawer 42, a radio frequency identification (RFID) reader 44, a printer/check reader 46, a biometric device and a signature capture device 50. In some embodiments, the barcode scanner (also known as an optical code scanner) and scale 34 includes a laser based and an image based scanner for reading optical codes. Some embodiments just use an image based scanner.

Figure 3:
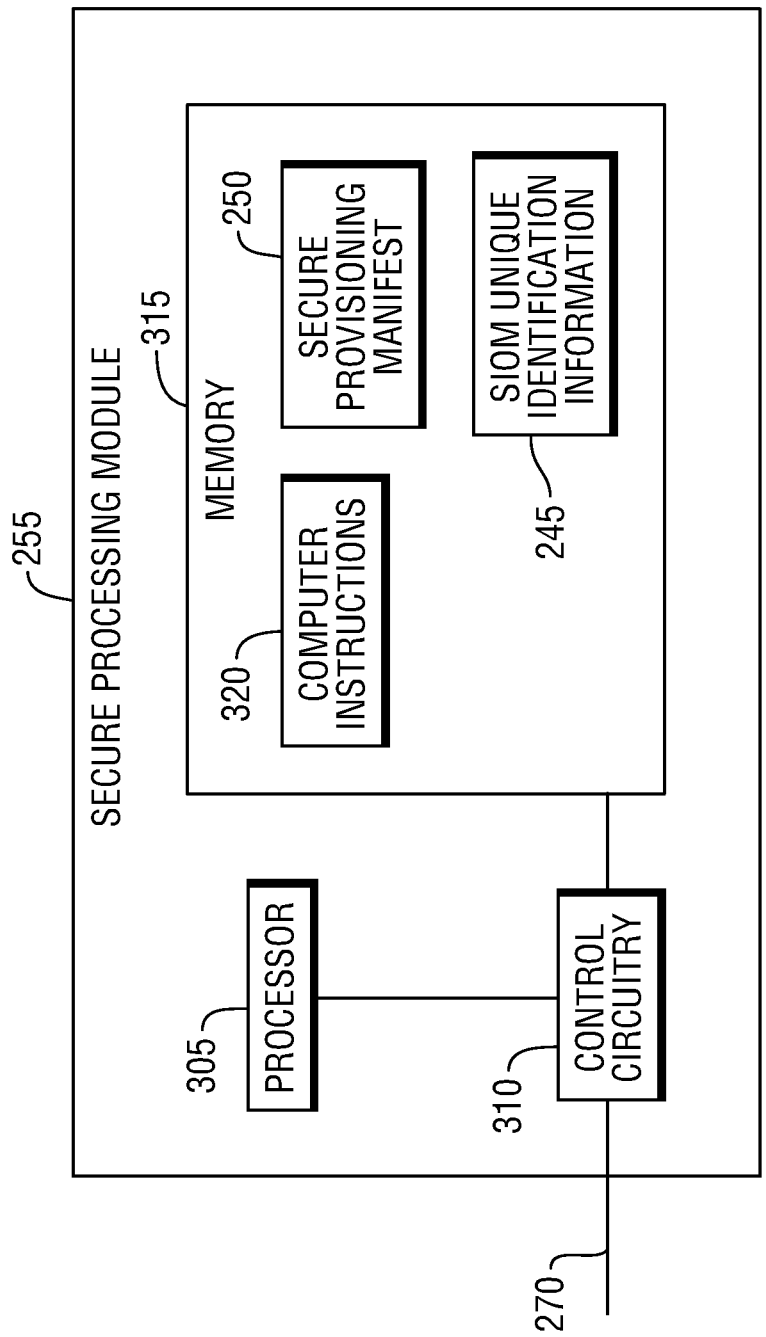
FIG. 3 is a high-level block diagram illustrating selected hardware and software components of a secure processing module.

With reference to FIG. 3, there is provided a high-level block diagram illustrating selected hardware and software components of the secure processing module 255. The secure processing module 255 includes a processor 305, a memory 315 and control circuitry 310. Stored within the memory 315 are computer instructions 320, the secure provisioning manifest 250 and information 245 that uniquely identifies the secure I/O module 230. The computer instructions include instructions that implement the secure I/O module 230 and the security module 235. When the processor 305 executes the computer instructions 320, the computer instructions 320 cause the processor 305 to implement the features and functions performed by the secure I/O module 230 and the security module 235.

The memory 315 is comprised of non-transitory storage devices including both volatile and non-volatile memory. The non-volatile memory may include flash memory and other types of solid state electronic memory that are non-volatile. The processor 305 may include a processor that has multiple processor cores or may be comprised of multiple processors.

The memory 315 further includes the unique identification information 245 for the secure I/O module 230. The unique identification information 245 includes a unique identifier for the secure I/O module 230 and a private cryptographic key (private key) associated with the secure I/O module 230. The private key has a unique public key associated with it. The public key is stored in the enterprise provisioning server 20 and used to encrypt data sent to the secure I/O module 230. The secure I/O module 230 uses its private key to decrypt the data encrypted with its public key. Only the private key can decrypt data encrypted with the public key and only the public key can decrypt data encrypted with the private key.

The computer instructions 320 and the unique identification information 245 are injected or stored in the memory 315 during the process of manufacturing the secure processing module 255. The secure provisioning manifest 230 is stored in the memory 315 and is encrypted using the secure I/O module's 230 public key. The secure provisioning manifest 250 can be updated at anytime by any of a number of reasons. The enterprise provisioning server 20 generates a new version of the secure provisioning manifest 250 as needed using the unique public key for the secure I/O module 230.

For example, when a customer service technician replaces a failed peripheral in a transaction computer 30, the technician communicates information identifying the removed peripheral and information uniquely identifying a replacement peripheral to the enterprise provisioning server 20. The enterprise provisioning server 20 then generates an update secure provisioning manifest 250 for the transaction computer 30 using the public key for the secure I/O module 230 known to be present in that transaction computer 30. The updated secure provisioning manifest 250 is then transmitted to the transaction computer 30 over the network 25. The secure I/O module 230 receives the updated secure provisioning manifest 250 and stores it in the memory 315 replacing the prior version.

The control circuitry 310 allows the processor 305 to communicate with the computer bus 270. This allows the processor 305 to perform a number of software functions and hardware functions that interface with software executed by the processor 205. For example, the processor 305 can generate a logical peripheral interface that simulates a driver interface to one of the peripherals 260. The processor 205 accesses the logical peripheral interface instead of the physical peripheral interface. The processor 305 has access to the physical peripheral using the computer bus 270. In some embodiments, substituting the logical peripheral interface for the physical peripheral interface is transparent to the software being executed by the processor 205. This allows for the use of legacy software that does not need to be updated. In some embodiments, an application program interface (API) is used by software executed by the processor 205 to communicate with the peripherals 260. For certain peripherals, the API communicates over the computer bus 270 with the control circuitry 310 instead of communicating directly with the peripheral. The computer instructions 320 executed by the processor 305 receive and implement the communication requests.

In one embodiment, the secure processing module 255 is a hardware module installed on the motherboard 200. In some embodiments, the secure processing module 255 is preferably tamper resistant to prevent access to the cryptographic keys stored in the memory 315. Tamper resistance may include one or more of electrical and mechanical safeguards to prevent physical tampering with the secure processing module 255. For example, the secure processing module 255 may include electrical circuits and switches that detect opening of the enclosure of the transaction computer 30, physical intrusion into the secure processing module 255 or an enclosure around the secure processing module 255, and that erase the cryptographic keys and optionally the software stored in the memory 315, thereby disabling the secure processing module 255.

In one embodiment, the secure processing module 255 includes a processor 305, a memory 315 and control circuitry 310. Computer instructions 320 and data including information uniquely identifying the secure I/O module and a secure provisioning manifest are preloaded in the memory before the secure processing module 255 is mounted on the motherboard 200 or the computer instructions and the data are loaded into the secure processing module 255 after it is mounted on the motherboard 200 but prior to being shipped to a customer in the terminal computer 30.

The secure processing module 255 includes the security module 235 and the secure I/O module 230. Both of these modules may suitably be implemented in hardware or software or a combination of both.

With reference to FIG. 4, there is provided a high-level diagram illustrating an example of the secure provisioning manifest 250. The secure provisioning manifest 250 is delivered to and stored in the secure processing module 255 encrypted using the public key associated with the secure I/O module 230. When data from the secure provisioning manifest 250 is required, the secure I/O module 230 decrypts it using the private key 245 associated with the secure I/O module 230 and stored in the memory 315. A successful decryption of the secure provisioning manifest 250 also authenticates the secure provisioning manifest 250.

The information depicted in this embodiment of the secure provisioning manifest 250 is not meant to be limiting or all inclusive. The secure provisioning manifest 250 include two major sections. In this example, the first section 405 includes 12 records. Record 1 includes information that identifies the secure transaction service and the secure enterprise transaction server 15 used to process transactions for this transaction computer 30. Record 2 includes information that uniquely identifies the secure I/O module 230 installed on this transaction computer 30. Record 3 includes information that identifies an issue date for the secure provisioning manifest 250. Record 4 includes information that identifies an expiration date for the secure provisioning manifest 250. When this date is reached, the secure I/O module 230 requests a new secure provisioning manifest 250 from the enterprise provisioning server 20. Record 5 includes information that identifies a grace period for the secure provisioning manifest 250 which means an expired secure provisioning manifest 250 may still be used during the stated grace period.

Records 6-12 are policy records. The secure provisioning manifest 250 may include any number of policy records. This embodiment includes 7 policy records. A policy record includes a policy rule that defines how a resource can be used. Each policy record is associated with a peripheral or a resource of the transaction computer 30. There can be multiple policy records for each peripheral or resource. For example, the barcode scanner 34 can read 1D barcodes and 2D barcodes. 1D barcodes are typically used to identify items presented for purchase while certain 2D barcodes may be used to encode sensitive information on identification documents. Therefore, a first policy record associated with the barcode scanner peripheral 34 could have a rule requiring that data read from 1D barcodes is returned to the operating system 215 as decrypted clear text. A second policy record also associated with the barcode scanner peripheral 34, has a rule requiring that data from certain 2D barcodes could have a second rule requiring data read from 2D barcodes is returned to the operating system 215 as encrypted text to protect the data. The secure I/O module 230 retains a decrypted version of all the data and uses it to process a transaction if needed.

Records 6 and 7 are policy records associated with the PIN or pin pad component of the magnetic stripe reader peripheral 40. Record 8 is a policy record associated with the secure transaction service running on the enterprise transaction server 15. The rule can define which transactions are sent to the secure transaction service for processing and which transactions are sent to the operating system 215 for legacy processing by the transaction software 220. Record 9 is a policy record associated with the barcode scanner 34. Record 10 is a policy record associated with the magnetic stripe reader peripheral 40. Record 11 is a policy record associated with the near field communications peripheral with is included in the RFID reader 44. Record 12 is a policy record associated with the network controller 240 function of the motherboard 200. This record would include a rule on using the network controller 240 to communicate with external computers.

Certain legacy peripherals can not support encrypted secure sessions so policy records are set up for these peripherals that state the peripheral can not support encrypted sessions so do not attempt to establish a secure session.

The second section 410 of the secure provisioning manifest 250 includes a list of peripherals that are authorized to be connected to the transaction computer 30. Any peripheral attached to the transaction computer 30 that is not listed in this section of the secure provisioning manifest 250 is not authorized to be attached to the transaction computer 30 and the secure I/O module 230 will not communicate with it. The operating system 215 may still be able to communicate with the peripheral in some situations. However, the secure I/O module 230 will not communicate with the peripheral and will send an alert or error report to the enterprise provisioning server 20 listing any acquired information about the unauthorized peripheral. A policy record can be included with a rule that determines what action the secure I/O module 230 should take when an unauthorized peripheral is found. The rule may cause the secure I/O module 230 to shut down the transaction computer 30 or it may allow normal operations of the peripheral if it is considered a legacy peripheral.

The second section 410, as depicted in this example, has information on 5 peripherals. The record for each peripheral includes information 415 unique to each peripheral. The information 415 includes an item identification, a public key associated with the peripheral, a vendor identification, a vendor product identification, a vendor serial number and a reference to the policy records that should be applied to this peripheral. The public key is a cryptographic key associated with a private key where both keys are associated with the peripheral. The private key is stored in the peripheral. The secure I/O module 230 uses the public key to encrypt and decrypt secure data sent to and received from the peripheral over a secure session with the peripheral.

In some embodiments, the vendor serial number may include a range of serial numbers instead of a single serial number. When a range is specified, a peripheral will be authenticated if the serial number for the peripheral falls within the specified range. Using a range of serial numbers allows a customer that operates a number of transaction computers 30 and to replace a peripheral in one transaction computer with a similar model peripheral from another transaction computer without having to call and wait for a customer service person to arrive and perform a peripheral update. A customer would want to do this if a peripheral failed.

The peripheral's public key and private key form a unique public/private key pair that has been generated and associated with the peripheral. In some embodiments, the key pair is generated and the private key is injected or stored in the peripheral's long term memory at some point during the process of manufacturing the peripheral. The public key is provided with the peripheral but not stored in the memory of the peripheral. When the peripheral is registered with the transaction system 10, information about the peripheral including the vendor's model number, the vendor's serial number, the vendor's product identification and the public key are sent to the enterprise provisioning server 20 and stored in a database of registered peripherals.

After the peripheral has been registered, the peripheral is attached to the transaction computer 30 either during the manufacture of the transaction computer 30 or during a field upgrade or replacement process performed on the transaction computer 30. An authorized person then identifies the peripheral and the transaction computer 30 to the enterprise provisioning server 20 and informs the enterprise provisioning server 20 that the peripheral has been attached to the transaction computer 30. The enterprise provisioning server 20 then retrieves information about the peripheral from the database of registered peripherals and retrieves a copy of the current secure provisioning manifest 250 for the transaction computer 30 from a database of registered transaction computers. The enterprise provisioning server 20 adds a new record to the second section 410 of the retrieved version of the secure provisioning manifest 250 for the transaction computer 30 and further adds a policy record if needed. The new record includes the information from the peripheral database that uniquely identifies the peripheral. The updated version of the secure provisioning manifest 250 is then encrypted using the public key associated with the secure I/O module 230 and transmitted to the transaction computer 30. The enterprise provisioning server 20 replaces the old version of the secure provisioning manifest 250 stored in the database of registered transaction computers and associated with the transaction computer 30 with the updated version of the secure provisioning manifest 250. Once the secure I/O module 230 receives the updated secure provisioning manifest 250 and authenticates it, the secure I/O module 230 will recognize the newly attached peripheral and authorize communications with it.

Figure 5:
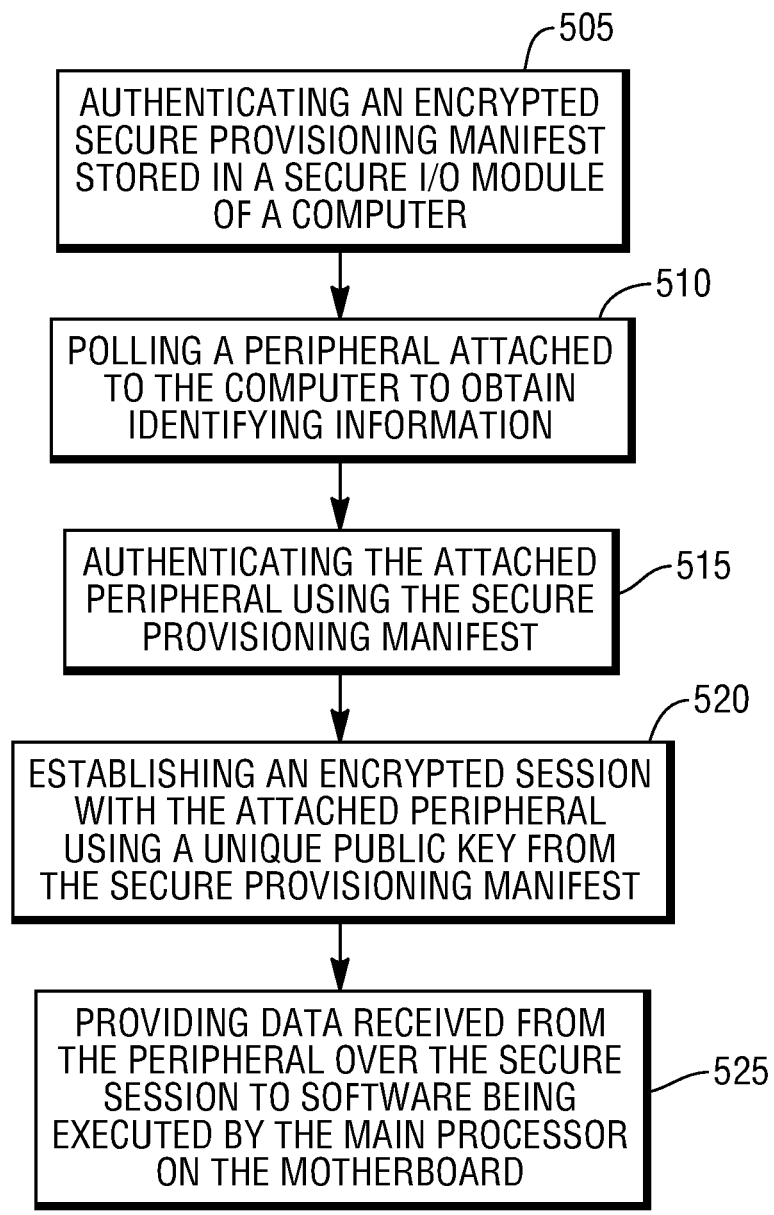
FIG. 5 is a flow diagram illustrating a method of operating a secure I/O module using a secure provisioning manifest.

Turning to FIG. 5, there is provided a flow diagram illustrating a method of operating the secure I/O module 230 using the secure provisioning manifest 250 to authenticate and communicate with peripherals 260 attached to the transaction computer 30. In step 505, the secure I/O module 230 authenticates the secure provisioning manifest 250 stored in the memory 315 of the secure processing module 255. The secure provisioning manifest 250 has been encrypted using the secure I/O module's 230 public key. Only the secure I/O module's 230 private key can successfully decrypt the encrypted secure provisioning manifest 250. The secure I/O module performs a decrypt operation on the encrypted secure provisioning manifest 250 using the private key 245 stored in the memory 315. The secure provisioning manifest 250 is authenticated if the decrypt operation successfully generates a proper clear text version of the secure provisioning manifest 250. The secure I/O module 230 can determine if the decrypt operation was successful by calculating a checksum for the decrypted version secure provisioning manifest 250 and comparing it to a checksum stored in the secure provisioning manifest 250. If they match, the decrypt operation was successfully. If the decrypt operation is not successful, the secure I/O module 230 transmits an error report to the enterprise provisioning server 20. In some embodiments, the secure I/O module 230 will also stop the transaction computer 30 from performing any transactions until a new secure provisioning manifest 250 is received and authenticated.

In step 510, the secure I/O module 230 polls a peripheral attached to the transaction computer 30 and obtains information that uniquely identifies the peripheral. The information includes a vendor identification, a vendor product identification and a vendor serial number for the peripheral.

In step 515, the secure I/O module 230 compares the information received from the polled peripheral with peripheral information stored in the secure provisioning manifest 250. If there is a match, the peripheral is authenticated. If no match is found, the peripheral is not authenticated and the secure I/O module 230 will not communicate with the peripheral and will not establish a secure session with the peripheral. The secure I/O module 230 also transmits an error report to the enterprise provisioning server 20 identifying the peripheral, the fact that it was not authenticated and other information identifying the secure I/O module 230 and the transaction computer 30. If the peripheral is a legacy peripheral, the transaction computer 30 may still communicate with the peripheral using legacy processes.

In step 520, the secure I/O module 230 establishes an encrypted secure session with the attached peripheral if the peripheral was authenticated. The secure I/O module 230 uses the public key for the authenticated peripheral stored in the secure provisioning manifest 250 to encrypt data sent to the peripheral and to decrypt data received from the peripheral.

In step 525, the secure I/O module 230 provides data received from the peripheral using the secure session to the software executed by the processor 205 (main processor on the motherboard 200) according to the policy rules included in the secure provisioning manifest for the peripheral. The policy rules may allow all data to be provided as clear text or the policy rules may restrict some or all the data from being provided to the software executed by the processor 205.

Although the present invention has been described with particular reference to certain preferred embodiments thereof, variations and modifications of the present invention can be effected within the spirit and scope of the following claims.

What is claimed is:

1. A computer comprising:
a peripheral attached to a motherboard of the computer through a Universal Serial Bus (USB) controller of the motherboard;
the USB controller connected to a bus controller of the motherboard and a network controller of the motherboard;
a memory of the motherboard comprising an Operating System (OS) and transaction software;
a processor of the motherboard, the processor configured to process the OS and the transaction software from the memory within a execution environment stored in the memory;
a secure processing module connected to the bus controller and USB controller of the motherboard, the secure processing module comprising:
a secure hardware processor;
a secure memory;
executable instructions;
control circuitry;
a provisioning data structure comprising a plurality of records and list of authorized peripherals within the secure memory;
hardwired connections to the bus controller and the USB controller;

wherein the secure hardware processor is configured to execute the executable instructions from the secure memory to communicate over the hardwired connections with the peripheral within a secure execution environment stored in the secure memory, wherein the secure execution environment is separate from the execution environment, and wherein the executable instructions when executed by the secure hardware processor cause the secure hardware processor to perform processing to:

i) decrypt an encrypted version of the provisioning data structure using a private key of the secure hardware processor, wherein the provisioning data structure further comprises: encryption keys and information associated with the peripheral; and ii) establish a peripheral interface from the secure execution environment to communicate with the peripheral during an encrypted communication session that processes encrypted communications between the secure execution environment and the peripheral using the information and the encryption keys when peripheral information is received from the peripheral with the peripheral information matching the information obtained from the provisioning data structure, wherein the executable instructions cause the hardware processor to establish the encrypted communication session using the provisioning data structure and without transferring the encryption keys or other cryptographic keys between the secure processing module and the peripheral;

the processor of the motherboard is further configured to:

a) execute the OS from the memory as the execution environment, and the execution environment is separate from the secure memory having the secure execution environment processed by the secure processor; and b) use, by the OS, the peripheral interface to control and communicate with the peripheral, wherein only the executable instructions of the secure execution environment processed by the secure processor from the secure memory being configured to decrypt communication information received from the peripheral during the encrypted session using the encryption keys.

2. The computer of claim 1, wherein the secure execution environment further includes:

the secure memory, wherein the secure hardware processor when executing the executable instructions: processes the information from the secure memory, and uniquely identifies the secure execution environment and the provisioning data structure from the secure memory, and wherein the provisioning data structure is stored in the secure memory; and the secure processor configured to communicate with the secure memory and to execute the executable instructions stored in the secure memory which causes the secure processor to implement the features of the secure execution environment including establishment of the encrypted communication session with the peripheral, generation of the peripheral interface and making a logical peripheral interface accessible to the operating system.

3. The computer of claim 2, wherein the secure processing module is implemented by an electronic component installed on a logic board of the computer.

4. The computer of claim 3, wherein the information uniquely identifying the secure processing module is provided into the secure memory during the process of manufacturing of the secure processing module.

5. The computer of claim 4, wherein the information uniquely identifying the secure processing module includes a private cryptographic key uniquely assigned to the secure processing module wherein the private key has an associated unique public cryptographic key.

6. The computer of claim 5, wherein the provisioning data structure is encrypted using the public cryptographic key of the secure execution environment.

7. The computer of claim 1, wherein the provisioning data structure includes a plurality of policy records wherein at least one policy record defines a rule for the data and the operation of the peripheral attached to the computer.

8. The computer of claim 7, wherein the provisioning data structure further includes the list that identifies one or more peripherals that are authorized to be attached to the computer for secure operation.

9. The computer of claim 8, wherein the list identifying the one or more peripherals includes for each peripheral a public cryptographic key uniquely assigned to the peripheral and a reference to at least one policy that defines a rule that will be applied to the operation of the peripheral.

10. The computer of claim 9, wherein the peripheral is configured to establish the encrypted communication session and to send and receive all data as encrypted data once the encrypted communication session is established with the secure execution environment.

11. The computer of claim 1, wherein the computer is a point of sale transaction terminal and wherein the processor is further configured to execute a purchase transaction application, wherein items are presented to the sale transaction terminal for scanning, identifying, and purchasing, and wherein the purchase transaction application processing a payment for the items.

12. The computer of claim 1, wherein the peripheral information received from the peripheral by the secure execution environment includes unique identification information that identifies the peripheral.

13. The computer of claim 12, wherein the unique identification information includes a serial number for the peripheral.

14. The computer of claim 1, wherein the peripheral communicates with the computer over a universal serial bus (USB).

15. The computer of claim 1, wherein the peripheral is a financial card reader that includes a numeric key pad.

16. The computer of claim 1, wherein the peripheral is an optical code scanner, and wherein the optical code scanner encrypts optical code data for transmission over the encrypted communication session.

17. The computer of claim 1, wherein the provisioning data structure includes a plurality of policy records wherein at least one policy record defines a rule for the operation of a function of the computer, and wherein the function is independent of communications with the peripheral.

18. A method comprising:

authenticating, by a secure processor that executes executable instructions from a secure execution environment defined within a secure memory of a motherboard of a computer an encrypted provisioning data structure stored in the secure memory that is separate from a main memory of the motherboard, wherein authenticating further includes determining that the encrypted provisioning data structure is authenticated when the encrypted provisioning data structure is decrypted with a private key of the secure processor as a decrypted provisioning data structure, and wherein a bus controller on the motherboard connects a main processor of the motherboard to the secure processor and the bus controller also connected to a Universal Serial Bus (USB) controller;

reading, by the secure processor, from the decrypted provisioning data structure, encryption keys for communication with attached peripherals to the computer that are attached via the USB controller, wherein the decrypted provisioning data structure comprises: data structure which comprises a plurality of records and a list of authorized peripherals;

managing, by the secure processor, encrypted communication sessions between the executable instructions and the peripherals with the encryption keys;

polling, by the secure processor, a particular peripheral attached to the computer through the USB controller to obtain information that uniquely identifies the peripheral;

authenticating, by the secure processor, the particular peripheral attached to the computer when the information that uniquely identifies the particular peripheral from the polling matches peripheral information stored in the decrypted provisioning data structure;

establishing, by the secure processor, a particular encrypted session with the particular peripheral, wherein communications with the particular peripheral are encrypted using a unique public key associated with the particular peripheral that is obtained from the decrypted provisioning data structure as a particular encryption key for the particular peripheral, wherein establishing further includes establishing the particular encrypted session using the decrypted provisioning data structure and without transferring the encryption keys or other cryptographic keys between the secure execution environment and the particular peripheral; and independently maintaining, by the main processor of the computer, a second execution environment within the main memory by the main processor processing an Operating System and transaction software for the computer from the main memory, wherein the second execution environment is separate from the secure execution environment maintained by the secure processor within the secure memory.

19. The method of claim 18, further comprising:
providing data received from the particular peripheral over the particular encrypted session to the OS being processed by the main processor within the main memory.

20. The method of claim 19, wherein a policy record associated with the particular peripheral and stored in the provisioning data structure includes a policy rule used by the executable instructions to determine what data may be provided to the OS.

21. The method of claim 20, wherein the policy rule further determines what portion of the data is decrypted and provided to the operating system in clear text form.

22. The method of claim 18, further comprising:
receiving an updated version of the provisioning data structure from an enterprise provisioning server.

23. The method of claim 18, wherein the OS is executed from the main memory as the second execution environment by the main processor of the motherboard, and wherein the executable instructions are executed from the secure memory as the secure execution environment by the secure processor as a separate secure execution environment of the motherboard, and wherein the second execution environment does not allow direct access to elements within the secure execution environment.

24. The method of claim 18, wherein the obtained information uniquely identifying the particular peripheral includes a serial number for the peripheral.

25. The method of claim 24, wherein the decrypted provisioning data structure includes a serial number of the particular peripheral authorized to be attached to the computer.

26. The method of claim 18, further including:
when a second peripheral attached to the computer is not authenticated, terminating normal operations of the computer to prevent compromising sensitive information.

27. A secure transaction system comprising:
an enterprise transaction server in communication with a network;
an enterprise provisioning server in communication with the network and the enterprise transaction server; and
a plurality of transaction computers each in communication with the enterprise transaction server and the enterprise provisioning server over the network, each transaction computer of the plurality of transaction computers comprises:
a peripheral attached to the transaction computer through a Universal Serial Bus (USB) controller;
a motherboard, the motherboard including:
a main processor;
a main memory;
a bus controller;
the USB controller;
a secure processor;
and
a secure memory;
wherein the main processor connected to the bus controller, and the secure processor connected to the bus controller, and the bus controller connected to the USB controller;
wherein the secure memory includes:
executable instructions and a provisioning data structure that includes information for the peripheral and encryption keys for the peripheral, wherein the provisioning data structure comprises a plurality of records and a list of authorized peripherals;
wherein the secure processor executes the executable instructions from a secure execution environment within the secure memory, the executable instructions cause the secure processor to: i) obtain peripheral information provided by the peripheral when attached to the transaction computer, ii) obtain the information and the encryption keys from the provisioning data structure, and iii) establish a peripheral interface to an Operating System (OS) of the main processor that manages an encrypted communication session with the peripheral to receive and provide encrypted peripheral data from and to the peripheral using the encryption keys when the peripheral information matches at least a portion of the information;
wherein the main processor executes the OS and transaction software from a second execution environment within the main memory on the motherboard, and wherein the secure processor executes the executable instructions and the encrypted communication session with the peripheral interface as the secure execution environment for peripheral communications, and wherein the OS processes the peripheral interface for communication with the peripheral from the second execution environment defined within the main memory, and wherein the secure processor, based on the executable instructions, communicates with the peripheral through the encrypted communication session and maintains control over decrypting the communications from the secure execution environment using the encryption keys, and wherein the secure execution environment is connected on the motherboard to the second execution environment via the bus controller;

wherein the enterprise provisioning server generates the provisioning data structure uniquely encrypted for the executable instructions executed by the secure processor in each transaction computer and transmits each encrypted provisioning data structure to the associated secure processor, the provisioning data structure encrypted with a public key of the secure processor and is only capable of being decrypted by a private key of the secure processor;

wherein the encrypted communication session is established using the provisioning data structure and without transferring the encryption keys or other cryptographic keys between the secure execution environment and the peripheral.

\* \* \* \* \*